Oct. 8, 1963    L. W. SCHOPPEE ETAL    3,106,118
AUTOMATICALLY CONTROLLED MAGAZINE FEED
MEANS TO INSURE CONSTANT OUTPUT RATE
Filed Aug. 24, 1961    10 Sheets-Sheet 1

Fig. 1.

INVENTORS
LAWRENCE W. SCHOPPEE
FRANCIS CRESCENZO
BY Chapin & Neal
ATTORNEYS

Fig. 11.

United States Patent Office 3,106,118
Patented Oct. 8, 1963

3,106,118
AUTOMATICALLY CONTROLLED MAGAZINE FEED MEANS TO INSURE CONSTANT OUTPUT RATE
Lawrence W. Schoppee and Francis C. Crescenzo, Springfield, Mass., assignors to Package Machinery Company, East Longmeadow, Mass., a corporation of Massachusetts
Filed Aug. 24, 1961, Ser. No. 133,615
12 Claims. (Cl. 83—11)

The present invention relates to improved means for feeding chewing gum to a wrapping machine.

The object of the invention is to minimize, if not eliminate, the time a wrapping machine must be shut down because of a failure or malfunction in the feeding of gum to the wrapping instrumentalities.

Another object of the invention is to reduce the amount of operator attention necessary to insure an adequate supply of gum.

These objects gain increased signifiance when it is realized that newly developed wrapping machines automatically convert slabs of gum into wrapped packs of single sticks, which are also individually wrapped, at the rate of upwards of 1500 sticks per minute. These wrapping machines comprise a magazine feed for advancing slabs of gum past slitting knives which score individual sticks in the slabs. The scored slabs are then fed to means which separate the sticks and feed them to the wrapping instrumentalities.

The present invention deals with improvements in the magazine feed of the slabs of gum to and through the slitting knives.

The magazine feed employs two magazines which enable a large supply of gum slabs to be provided by the operator without placing so much pressure on the gum as to cause a feeding malfunction. Under normal operating conditions slabs are fed from the two magazines to the slitting knives. In the event of a malfunction in one of the magazines, means are provided for automatically feeding slabs from the other magazine at a doubled rate so that there is no decrease in the speed of operation, let alone a shut down, of the wrapping machine.

These means preferably include a central platform to which the slabs are fed. Conveyor means advance the slabs towards the slitting rolls at a given rate. Means are provided for feeding slabs from one magazine to the platform at this given rate. Means are provided for feeding slabs from the other magazine to this platform at said given rate. These feeding means are, normally, alternately actuated for single cycle operation. Means are provided for detecting a failure in either feeding means and then actuating the remaining magazine for continuous operation to maintain a constant supply of gum for the wrapping machine.

The above and other related objects and features of the invention will be apparent from a reading of the following description of the disclosure found in the accompanying drawings and the novelty thereof pointed out in the appended claims.

Figure 1:
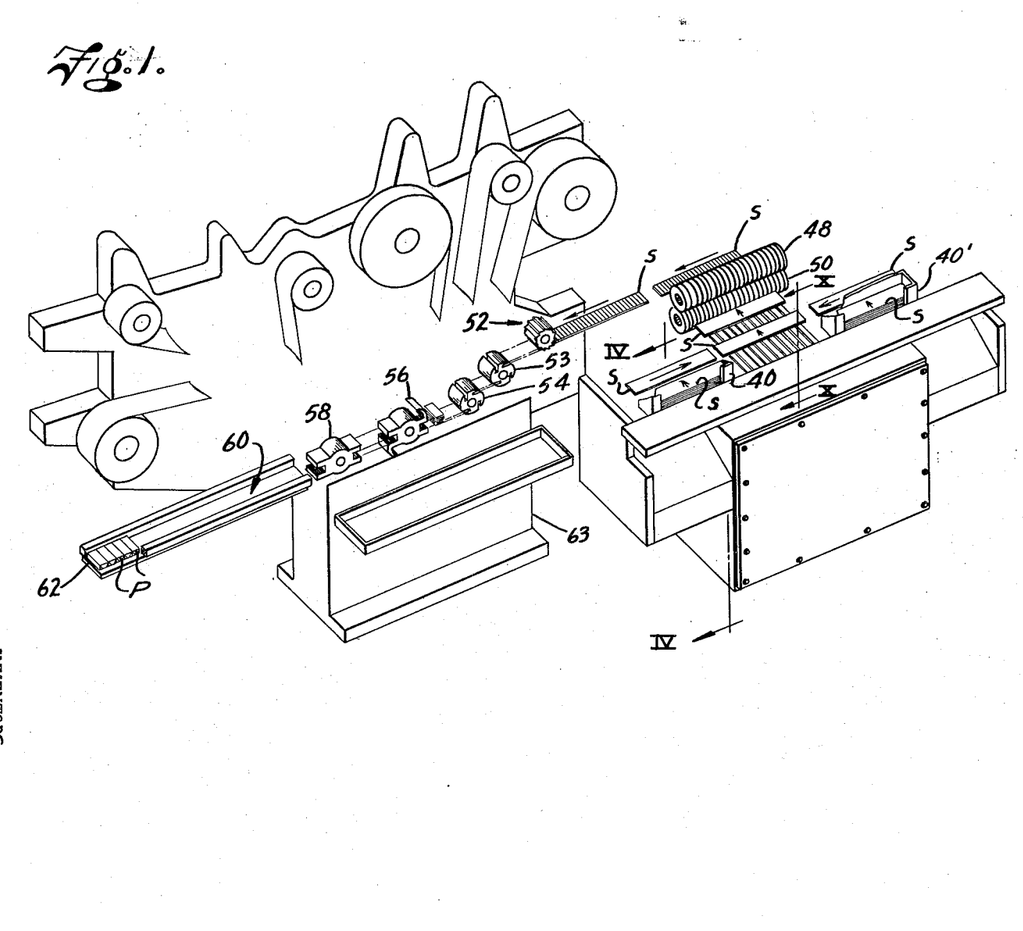
FIG. 1 is a perspective view on a reduced scale of a machine embodying the present invention with portions thereof broken away and other portions shown diagrammatically.

Reference is first made to FIG. 1 for an overall understanding of the operation of the machine. Slabs of gum S are manually stacked in magazines 40, 40'. The slabs S are fed one at a time to a receiving platform at the rear of each magazine. Slabs are then alternately fed inwardly, as the arrows indicate, by overhead transports (not shown) to a central position aligned with a pair of slitting rolls 48, 50. The spaced slabs are then advanced toward and through the slitting rolls which define individual sticks in the slabs S. After passing to the rear of the slitting rolls, the scored slabs are then fed transversely in the direction of their elongated dimension, as indicated by the arrow, toward breaker mechanism 52 which separates individual sticks of gum from the slabs and spaces the sticks apart as they continue their advance. The individual sticks of gum are then wrapped by means including a first tumble box 53 and banded by means including a second tumble box 54. Thereafter they are automatically stacked in groups of five and each group of five is wrapped by means including the next two tumble boxes 56, 58. The wrapping of the packs of gum is completed as they are advanced through a folding channel 60 and the wrapped packs P are then discharged along a platform 62 which is a continuation of the channel 60. The breaker mechanism and the wrapping instrumentalities are mounted on a main frame 63 which also supports the drive means therefor.

It will be understood that the wrapping instrumentalities per se are substantially identical in their operational principles to those disclosed in U.S. Patent No. 2,276,744, granted March 17, 1942 in the names of E. L. Smith and C. E. Melhorn, and reference is made thereto for a detailed description of the construction and operation of such wrapping instrumentalities. Several rolls of wrapping material are shown in FIG. 1 which can be laminated according to known methods to obtain the desired wrappers for the gum.

Figures 2, 3, 3A:
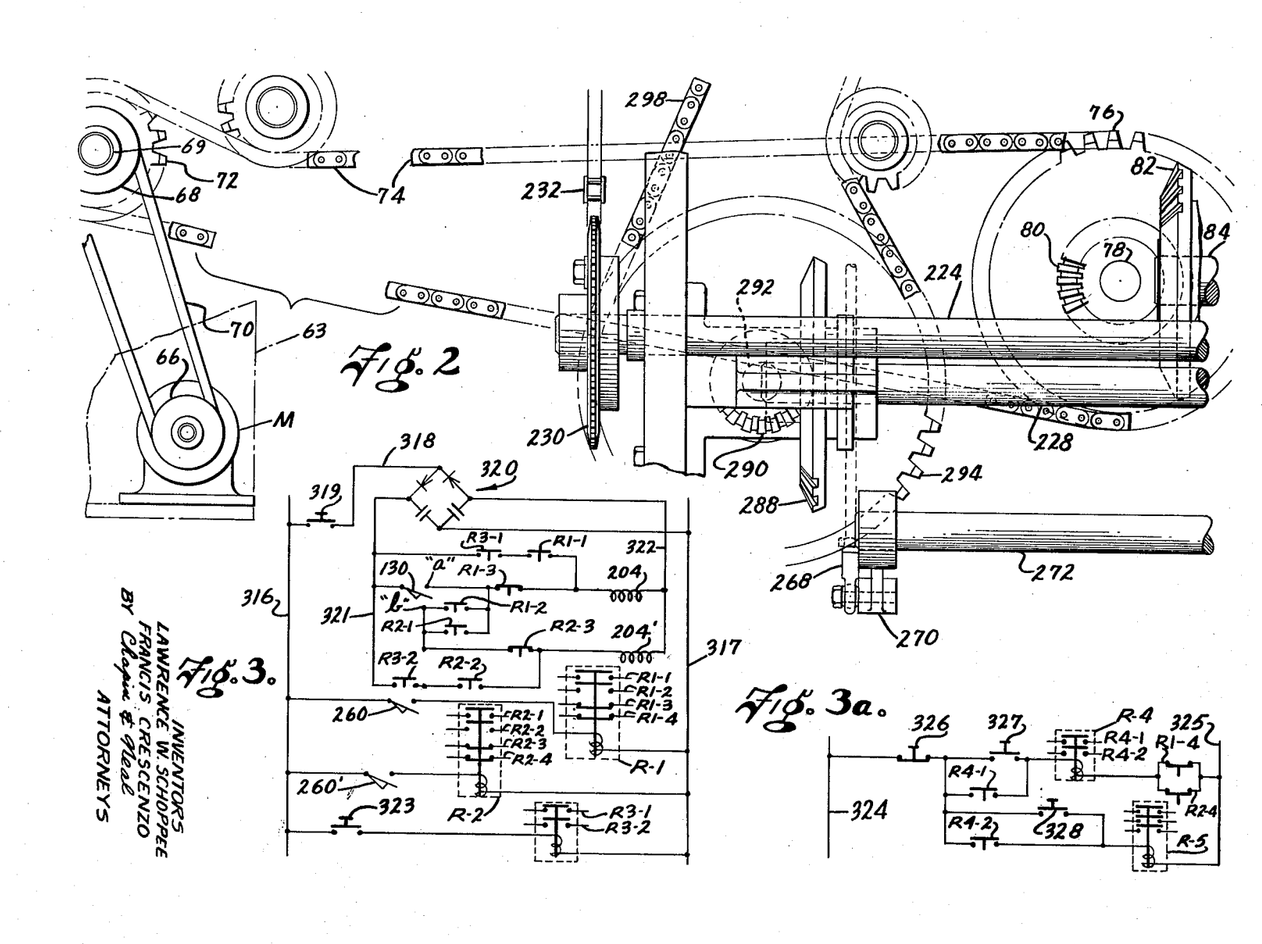
FIG. 2 is a front elevation of drive mechanism for the machine.
FIG. 3 is a diagram of the electrical circuit controlling the feeding means for the machine.
FIG. 3a is a diagram of the electrical circuit for the motor drive of the present machine.

The various means briefly described above are driven from a common power source, namely the motor M, seen in FIG. 2, which is mounted at the base of the main frame 63. The motor M has a pulley 66 on its output shaft and drives a pulley 68 through a belt 70. The pulley 68 is secured to a jack shaft 69 to which the driving means for the breaker mechanism and wrapping instrumentalities are connected for operation in a timed relationship. A sprocket 72 is keyed to the shaft 69 and in turn drives a chain 74. The chain 74 extends to a sprocket 76 which is fast upon an appropriately journaled shaft 78. The shaft 78 has secured to its forward end a bevel gear 80 which meshes with a second bevel gear 82. Bevel gear 82 is secured to a shaft 84 which may be referred to as the main driving shaft for both the magazine feed and the slitting rolls including infeed and discharge means therefor. Referring next to FIGS.

4 and 5 it will be seen that a sprocket 86 is secured to shaft 84 and a chain 88 is trained therearound. The chain 88 drives a shaft 90 through a sprocket 92. The shaft 90 is journaled in a frame member 96 (FIG. 5) and extends to and is journaled in a central vertical bearing plate 98 which is supported on a base frame member 100. Two gears 102, 102' and a single gear 104 (see also FIGS. 6 and 7) are secured to the shaft 90. The gear 104 meshes with a gear 106 and drives a shaft 108 at half the rate as the shaft 90. The shaft 108 is a timing shaft for purposes which later appear. The gears 102, 102' mesh with gears 109, 109' which in turn are adapted to drive operating shafts 110, 110' for the magazine feed.

At this point it will be noted that the mechanism for feeding slabs of gum from the magazines 40, and 40' is identical and that a description of one will suffice for a description of the other. For the most part the present description will be of the left hand magazine 40 and corresponding parts in the right hand magazine 40', where shown or described, will be identified by primed reference characters.

A cam 112 (FIGS. 5 and 7) is secured to the shaft 108. A follower 114 is carried at the end of a lever arm 116 and engages the cam 112. The lever 116 is pivotally mounted on a headed pin 118 projecting from the bearing plate 98. A spring 120 extending from the lever arm 116 to a spring pin 122 on the base 100 urges the follower 114 into engagement with the cam 112. A screw 132 is threaded into the outer end of the lever arm 116 to adjustably engage the plunger of a switch 130. As will later be described, the switch 130 controls the feeding of slabs of gum from one or the other of the magazines 40, 42.

Figure 4:
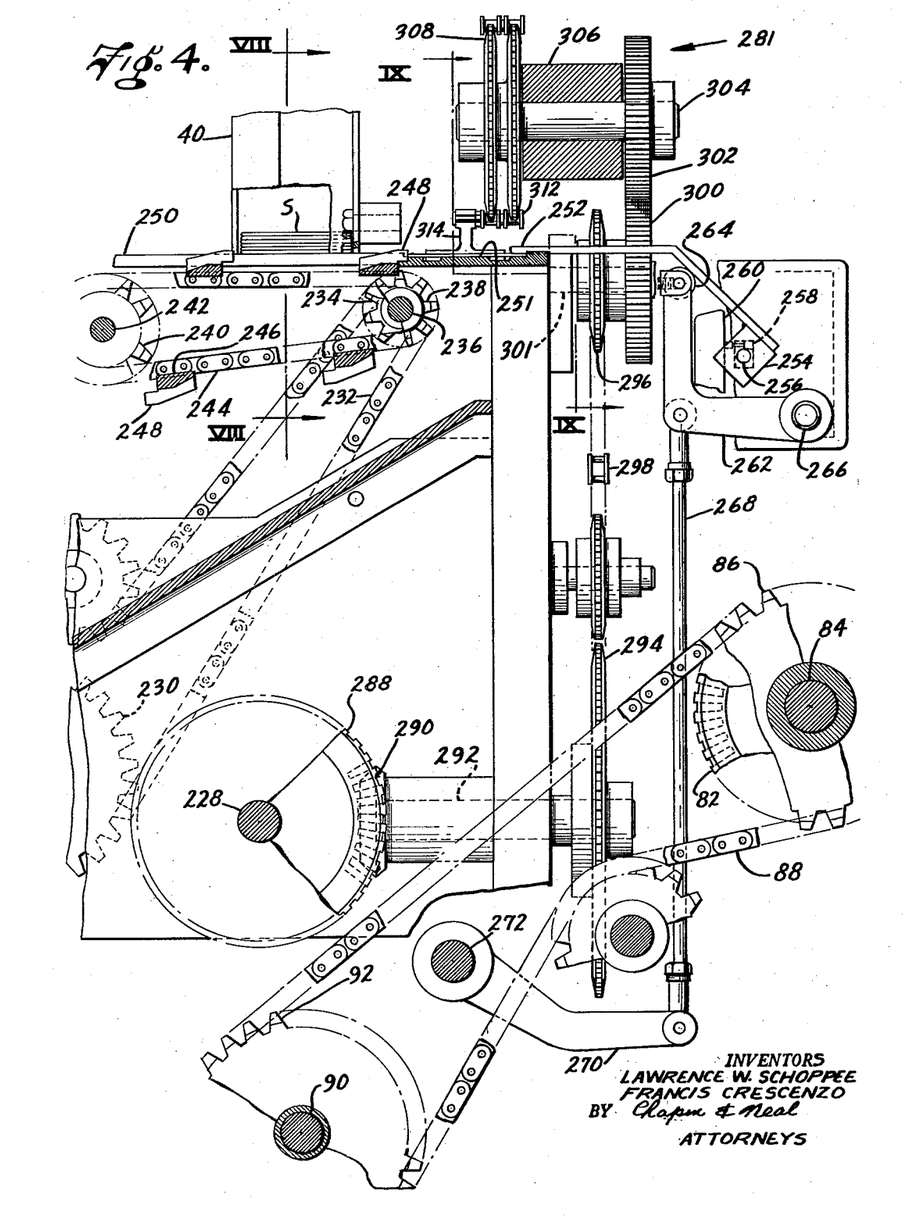
FIG. 4 is a section taken generally on lines IV—IV in FIGS. 1 and 5.
Figure 5:
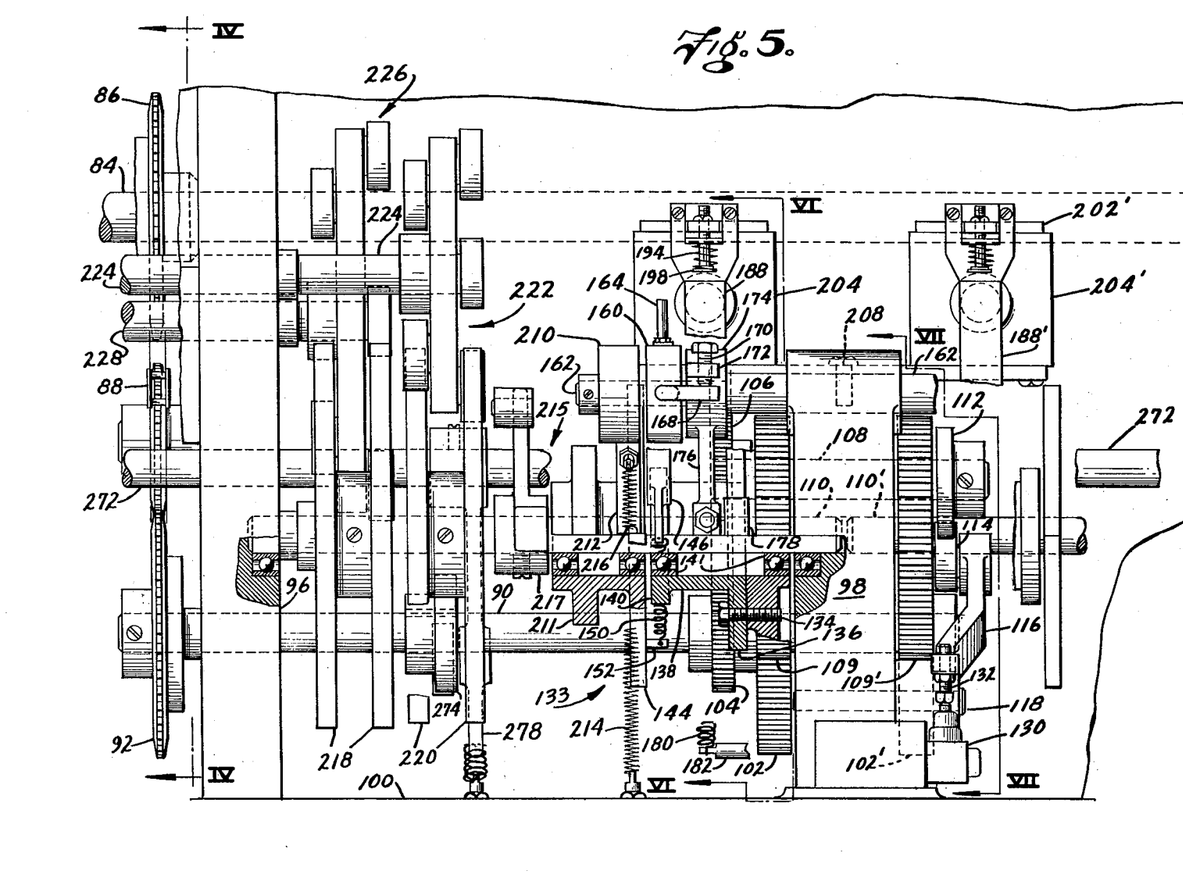
FIG. 5 is a front elevation, with portions thereof broken away, showing driving mechanism for the magazine feed.

The gear 109 drives the shaft 110 through a single revolution clutch 133 which will now be described, with reference to FIGS. 5 and 6. The gear 109 is secured by screws 134 to a clutch member comprising a cam 136, a hub 138 and a ratchet 140 having a single tooth 142. The gear 109 and the clutch member thus rotate as a unit and are journaled by ball bearings 141 (FIG. 4), for free rotation relative to the shaft 110. A disc 144 is rotatably mounted on the shaft 110 adjacent the ratchet 142. A pawl 146 (FIG. 6) is pivotally mounted by a pin 148 on the disc 144. A tension spring 150 extends between the outer end of the pawl 146 and a pin 152 projecting from the plate 144 and urges the pawl 146 toward the ratchet 140.

Figure 6:
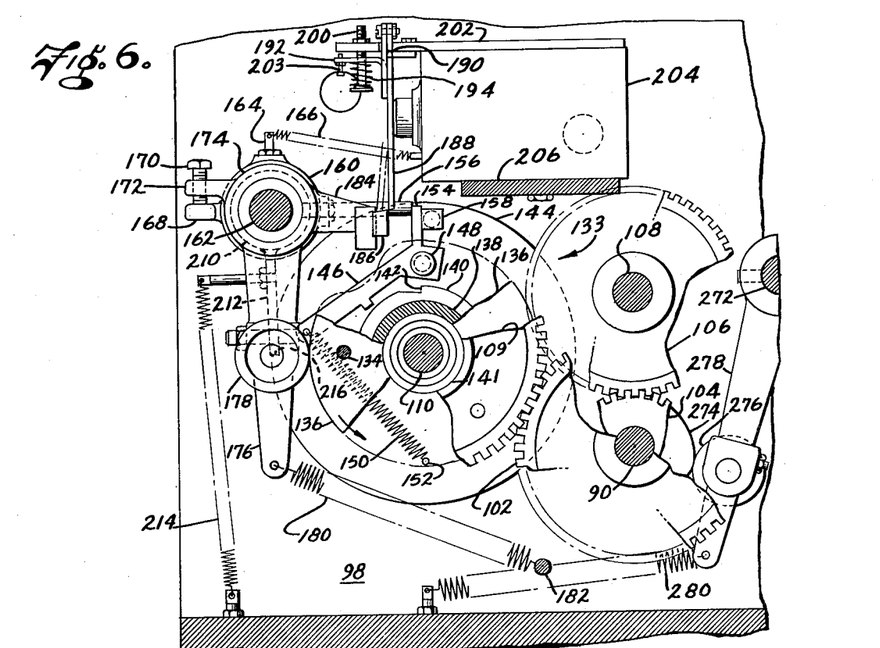
FIG. 6 is a section taken on line VI—VI in FIG. 5.
Figure 7:
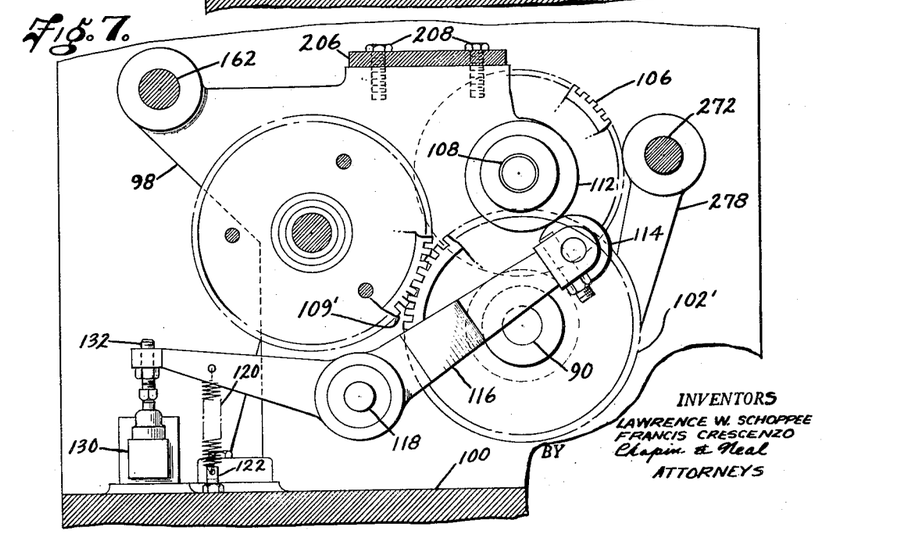
FIG. 7 is a section taken on line VII—VII in FIG. 5.

The clutch 133, as illustrated in FIG. 6, is disengaged, that is the pawl 146 is out of engagement with the tooth 142. It will be seen that the pawl 146 has a tail 154 which is held by a pin 156 against a block 158 projecting from the plate 144 to maintain the pawl out of driving engagement. The pin 156 projects from a hub 160 which is rotatably mounted on a shaft 162. The shaft 162 projects from the central plate 98 (FIG. 5). A pin 164 (FIG. 6) projects upwardly from the hub 160 and a spring 166 urges the hub 160 in a clockwise direction bringing the pin 156 to its illustrated position. An L-shaped finger 168 projects from the front of the hub 160 and underlies an adjustable screw 170 which is threaded into a projection 172 extending from a hub 174 which is also pivotable on the shaft 162. An arm 176 depends from the hub 174 and carries a roll 178 which is urged into engagement with the cam 136 by a spring 180 extending between the arm 176 and a pin 182 projecting from the plate 98. The hub 174 has a second shorter arm 184 projecting rearwardly therefrom and carrying a replaceable striker plate 186 which underlies a latch plate 188. The latch plate 188 is mounted for pivotal movement about point 190 between the illustrated full line and phantom line positions. A spring 194 is confined by a screw 200, threaded into a fixed plate 202, against an angle piece 192 on the latch plate 188 to urge the latch plate towards its phantom position as limited by screw 203. The plate 202 is mounted on a solenoid 204 which in turn is secured to a plate 206. The plate 206 is fastened by screws 208 to the vertical mounting plate 98.

Energization of the solenoid 204 will cause the plate 188 to come to its full line position illustrated in FIG. 6 while the spring 194 urges the latch plate 188 to the phantom position.

The solenoid 204 is energized and de-energized by actuation of the switch 130 as is later described in greater detail. However, the operation of the one revolution clutch may be understood by assuming that the solenoid 204 is energized with the parts in the relative positions seen in FIG. 6. With the cam 136 rotating in the indicated counterclockwise direction and with the latch plate 188 drawn into nonobstructive relation relative to the striker plate 186 the following sequence will occur. The cam follower 178 will be drawn into the depression of cam 136 by spring 180. As this occurs counterclockwise rotation will be imparted to the hub 174 and the screw 170, which in turn imparts counterclockwise rotation to the finger 168 and the hub 160, thereby raising the pin 156 above the tail 154. Thereupon the spring 150 is free to draw the pawl 146 towards the ratchet 140 prior to the single tooth 142 coming beneath the tooth on the pawl 146. Upon further rotation of the ratchet 140 the disc 144 will be positively driven by engagement of the pawl 146 with the tooth 142. The disc 144 and all parts connected therewith will rotate one full revolution under normal operation. Thus in normal operation after the disc 144 is rotated a distance sufficient to carry the tail 154 beyond the pin 156 the solenoid 204 will be de-energized. The latch 188 will return to its phantom position under the influence of spring 192. The arm 176 will be rotated in a clockwise direction upon further rotation of the cam 136 and the hub 160 will be rotated in a clockwise direction by the spring 166, thereby returning the rod 156 to the illustrated full line position. In this position when the disc 144 is approaching the end of a full revolution the rod 156 will engage the tail 154 thereby disengaging the pawl 146 from the single tooth 142. The disc 144 and all parts associated therewith will immeditaely stop, while the gear 109 and the clutch member secured thereto will continue to rotate.

A third hub 210 is mounted on the shaft 162 and has a depending finger 212 which is urged toward the disc 144 by a spring 214. The plate 144 has a tooth 216 formed in its outer periphery which is engaged by the finger 212 to prevent rebound of the disc 144 in a counterclockwise direction when the tail 154 is engaged by the rod 156 at the end of one revolution of rotation.

The disc 144 (FIG. 5) is integrally formed with one part 211 of a two-part over-load drive 215, the other part of which, 217, is connected to the shaft 110. The two parts of the over-load drive are connected by spring means, not shown, which limit the torque that can be transmitted to the shaft 110. Thus if the shaft 110 should become stalled the overload drive will become operative and the disc 144 will continue at least through its full cycle of rotation without imposing an undue strain on the shaft 110 and the parts driven thereby. It is for this reason that the disc 144 is mounted by the illustrated ball bearings on the shaft 110.

Secured to the shaft 110 are two sets of conjugate cams 218, 220. The cams 220 are part of a roller Geneva mechanism 222 for driving a shaft 224, and the cams 218 are part of a roller Geneva mechanism 226 for driving a shaft 228. The Geneva mechanism 222 is arranged to rotate the shaft 224 90° for each rotation of the shaft 110, and the Geneva mechanism 226 is arranged to rotate the shaft 228 90° for each revolution of the shaft 110. The shafts 224 and 228 rotate during predetermined portions of the cycle of rotation of the shaft 110 to respectively feed gum from the magazine 40 and drive the cross feed transport which aligns the gum slabs with the slitting rolls.

Figure 8:
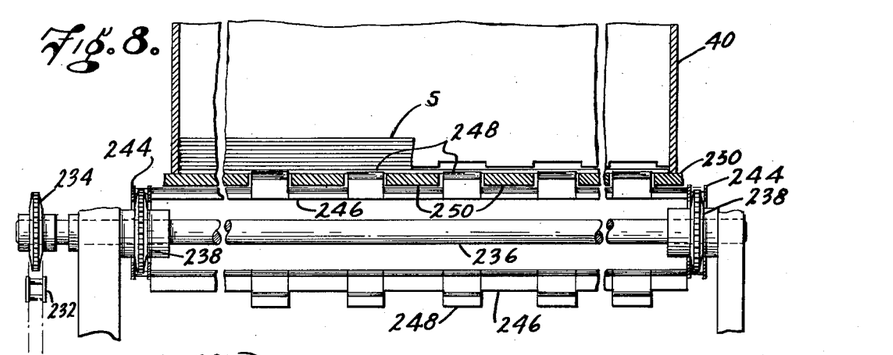
FIG. 8 is a section taken on line VIII—VIII in FIG. 4.

The shaft 224 has a sprocket 230 (FIGS. 2 and 4) secured to its outer end. A chain 232 is trained around the sprocket 230 and extends upwardly to a sprocket 234 (FIG. 4) which is secured to a shaft 236 which is appropriately journaled in brackets, not shown. A second pair of sprockets 238 (FIGS. 4 and 8) are secured to the shaft 236 and a pair of aligned sprockets 240 are mounted on a shaft 242 which is journaled in a suitable manner. A chain 244 is trained around each aligned pair of sprockets 240 and 238. Cross bars 246 extend between the chains 244 and have lugs 248 spaced apart along their lengths. Laterally spaced rails 250 are appropriately supported and extend beneath the magazine 40 to define the bottom thereof. It will be seen that the lugs 248 project above the rails 250 a distance somewhat less than the thickness of a single slab S. Thus as the sprockets 238 are rotated the lugs 248 will advance the bottommost slab of gum rearwardly from the magazine 40. The rear wall of the magazine 40 is spaced above the rails 250 a distance slightly greater than the thickness of a snigle slab S thereby facilitating the separation and feeding of single slabs of gum from the magazine. The amount of rotation imparted to the shaft 224 is sufficient to advance the lugs 248 an incremental step equal to the distance between the bars 246 along the lengths of the chains 244, thereby bringing the slab to the illustrated position (FIG. 4) on what may be referred to as a transfer platform 251.

Figure 9:
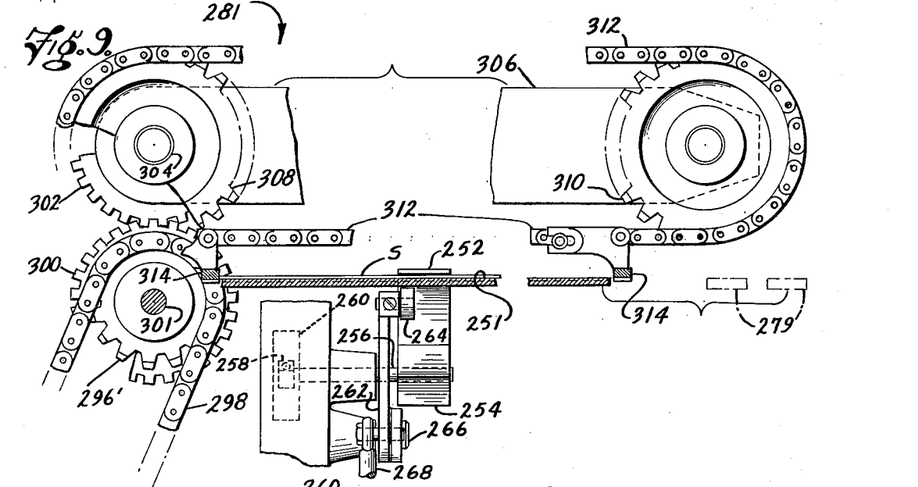
FIG. 9 is a section taken on line IX—IX in FIG. 4.

At this point attention is directed to a detecting finger 252 (FIGS. 4 and 9), the function of which is to automatically determine whether a slab of gum has been properly fed from the magazine 40. The detector finger 252 is secured to a block 254 which in turn is fast upon a shaft 256. The shaft 256 is appropriately journaled and carries a block 258 which is arranged to depress the plunger of a microswitch 260. Underlying the detector finger 252 is an L-shaped lever 262 having a roll 264 at its upper end against which the detector finger rests. The L-shaped lever 262 is pivotally mounted on a fixed stud 266. A link 268 is connected to the lever 262 at its upper end and to a lever 270 (see also FIG. 2) at its lower end. The lever 270 is secured to a shaft 272 which extends interiorly of the frame wall 96, see FIG. 5. The shaft 272 is oscillated by a cam 274 (FIGS. 5 and 6) which is engaged by a roller 276 mounted on a lever 278. The lever 278 is secured to the shaft 272 with spring 280 maintaining the roll 276 in engagement with the cam 274. The detecting fingers 252, 252' are both operated by the common shaft 272. In operation the fingers 252, 252' are held in an elevated position as slabs of gum are fed from the magazines 40 or 40'. Immediately after a slab of gum is fully discharged, as indicated by the slab of gum beneath the detector finger 252 in FIG. 4, the links 268, 268' are lowered causing the levers 262, 262' to allow the detector fingers to fall under their own weight. If slabs of gum have been properly fed, the detector fingers 252, 252' will come to rest upon the gum slabs, as illustrated in FIG. 4. If this condition exists, normal operation of the machine continues with slabs of gum being alternately fed from the platforms 251, 251'. However, if a slab of gum is not properly fed, the fingers 252, or 252' would fall to a further extent which would cause the lug 258 or 258' to close the switches 260 or 260'. Closure of either one of these switches will actuate automatic means, later described, for doubling the number of slabs fed from the magazine which has not had a malfunction.

Slabs of gum fed from the magazines 40, 40' onto the platforms 251, 251' are then advanced transversely toward a central platform comprising spaced rails 279 (FIG. 1). Means later described carry the gum slabs from along the rails 279 to the slitting rolls 48, 50 An over-head transport 281 (FIGS. 4 and 9) is driven by the shaft 228. Reference is again had to FIG. 2 where it will be seen that shaft 228 has secured to its outer end a bevel gear 288 which meshes with a second bevel gear 290 secured to one end of a shaft 292, see also FIG. 4. The shaft 292 has at its outer end a sprocket 294 which is drivingly connected to a sprocket 296 by a chain 298. The sprocket 296 is drivingly connected to a gear 300, see also FIG. 9, both of which are mounted on an appropriately mounted shaft 301. A gear 302 meshes with the gear 300 and is secured to a shaft 304. The shaft 304 is journaled in one end of a bracket 306 and has secured to its other end a double sprocket 308. A second pair of matching double sprockets 310 is mounted in aligned relation with the sprockets 308 at the opposite end of the bracket 306. A pair of chains 312 are trained around the sprockets 308 and 310. Flights 314 are mounted in offset relation on the chains 312 in spaced relation therealong. Rotation of the driving shaft 228 each cycle is sufficient for the flights 314 to be advanced a distance equal to the distance they are spaced apart along the chains 312, thereby advancing a slab S from the platform 251 to the central platform rails 279.

The overhead transport just described is mounted (by means not shown) for swinging movement, toward the rear of the machine, which will lift the flights 314 clear of the platform 251 in order to facilitate cleaning or clearing of a jam. Preferably the arrangement is such that the overhead transport may be swung about a center which maintains the gears 300, 302 in mesh so as not to lose the timed relationship of the flights 314 relative to the other operative mechanism of the machine.

The electrical circuit for controlling operation of the magazine feeding means will now be described with reference to FIG. 3.

Conductors 316, 317 are connected to a suitable source of alternating current and comprise a portion of the over-all electrical circuit for the machine. A line 318 is connected across the conductors 316, 317 and includes an off-on switch 319 and a capacity starved diode rectifier circuit 320. From the rectifier 320 a direct current potential is established across conductors 321, 322. The switch 130 (FIGS. 5 and 7) is a single pole double throw switch having contacts "a" and "b." Switch contact "a" is connected in series with relay contacts R1–3 and the coil of solenoid 204 and contact "b" is connected in series with relay contacts R2–3 and solenoid 204. The detector switch 260 is connected in series with the coil of relay R1 across the conductors 316, 317 while the switch 260' and the coil of relay R2 are also connected in series across the conductors 316, 317. A switch 323 is connected in series with the coil of a relay R3 across the conductors 316, 317.

The operation of the magazine feed, as controlled by this circuit, is as follows. With the motor M operating the shaft 90 (FIGS. 5 and 6) will rotate continuously. When the clutch mechanism is approximately in the relative position seen in FIG. 6, the detector fingers 252, 252' (FIG. 4) will have been lowered to detect slabs of gum which have been properly fed onto the platforms 251, 251' in previous cycles. With this normal condition, the switches 260, 260' both remain open. Next cam 112 (FIG. 7) will actuate switch 130 to close contact "a" whereby solenoid 204 is energized, contacts R1–3 being normally closed. Energization of the solenoid 204 causes the latch plate 188 to be drawn to the full line position illustrated in FIG. 6 so that the single tooth clutch 133 will be soon engaged to drive the shaft 110. Rotation of the shaft 110 first drives the overhead transport 289 (FIG. 8) so that the slab S is fed from the platform 251 onto the central platform rails 279. Further rotation of shaft 110 next drives shaft 236 (FIG. 4) so that the conveyor lugs 248 advance the lowermost slab of gum from the magazine 40 to the platform 251, thus completing one cycle of operation for feeding means for magazine 40 as the shaft 110 approaches the completion of one full revolution. The timed relationship in the operation of the overhead transport 281 and magazine conveyor 248 is obtained from the Geneva mechanisms 222, 226.

Assuming that a slab of gum has previously been properly fed from the other magazine 40' the solenoid 204' will next be energized and the solenoid 204 will be de-energized as the cam 112 moves the switch 130 into engagement with contact "b" (FIG. 3). The latch 188 will be in its phantom obstructive position causing the shaft 110 to stop after rotating a full revolution. The latch 188' will now be drawn to its non-obstructive position freeing the other single tooth clutch 133' to drive the shaft 110'. The shaft 110' first drives the overhead transport 281' to advance a slab of gum to the platform rails 279 and then drives the lugs 248' to feed the lowermost slab in magazine 40' to the platform 252'. It will be pointed out that the slab previously fed by the overhead transport 281 has by this time been advanced along the rails 279 by conveyor means later described. The feeding means for the magazine 40' completes its cycle of operation by the time the shaft 110' completes one full revolution. At this time the switch 130 again engages contact "a" to energize solenoid 204, as the shaft 110' is stopped and the feeding means for the magazine 40 is again actuated. In this fashion slabs of gum are alternately fed from the magazines 40, 40' to the central platform rails 279.

In the event a feeding failure occurs in feeding from the magazine 40, it will be detected by the finger 252 during operation of the feeding means for the magazine 40', i.e., the shaft 110' is rotating by reason of the clutch 133' being engaged. Thus, if a slab of gum is not properly positioned on the platform 251, the finger 252 will drop therebeneath closing the switch 260 whereupon the relay R-1 is energized. The relay contacts R1-3 thereupon open to prevent the solenoid 204 from being energized when the switch 130 is next moved to its "a" contact. Also contacts R1-2 close to provide an alternate path for the energization of solenoid 204'. Solenoid 204' is thus energized when switch 130 is engaged with either its "a" or "b" contact at the end of each full revolution of the shaft 110'. Clutch 133' is not disengaged under these conditions so that shaft 110' rotates continuously and slabs of gum are fed continuously from the magazine 40' to the platform rails 279. In effect, this means that the rate of feed from the magazine 40' is doubled even through the speed of the parts is not increased. After the malfunction in the feed for magazine 40 has been cleared, alternate operation can again be resumed.

A malfunction in feeding from the magazine 40' results in a corresponding continuous operation of the feeding means for the magazine 40. A feeding failure in the magazine 40' will be detected by the finger 250' and result in closing of switch 260'. Relay R2 is then energized resulting in opening of contacts R3-3 to prevent subsequent energization of solenoid 204'. So long as solenoid 204' is de-energized the shaft 110' and the feeding means for magazine 40' will remain inoperative, since energization of relay R2 also results in closure of contacts R2-1 which in turn provides a path for energizing solenoid 204 when switch 130 engages its "b" contact. Thus, in either position of switch 130 the solenoid 204 will be energized. This will result in the shaft 110 being continuously driven as slabs are fed from the magazine 40 to the central platform rails 279 at twice the usual rate. Regardless of a feeding failure in one magazine or the other, the rate at which slabs are fed to the slitting rolls and the rate of operation of the wrapping mechanisms remains constant.

Provision has been made for feeding a slab of gum from one or both of the magazines 40, 40' when there is no slab on the platform 251 or 251'. If after clearing a jam in the magazine 40, it is desired to actuate the feeding means for that magazine without manually placing a slab of gum on the platform 251, it is simply necessary to close switch 323. When this is done, contacts R3-1, connected to line 321, close. Switch 260 will be closed energizing relay R-1 and closing contacts R1-2 which are connected in series with contacts R3-1 to by-pass the switch 130 and energize the solenoid 204 so that a slab will be fed to the platform 251. On the next cycle of operation prior to the switch 260 again engaging contact "a," the detector 252 finds a slab properly fed on the platform 251 and switch 260 will remain open. The feeding means for magazine 40 will again be actuated and the regular alternate operation of the two feeding means will be resumed.

Similarly, where it is desired to first feed a slab to the platform 251' the switch 323 is closed resulting in closure of contacts R3-2, also connected to line 321, which are in series with contacts R2-2 and together by-pass switch 130 to energize solenoid 204' as the relay R2 is energized. The feeding means for the magazine 40' goes through a single cycle to feed a slab to the platform 251' and thereafter the alternate operation of the feeding means is resumed.

With reference next to FIG. 3a a simplified electrical circuit for the motor M will be described. This circuit comprises a pair of conductors 324, 325 which are connected to a suitable source of alternate current. Connected in series across these conductors are a stop switch 326, a start switch 327, the coil of a relay R4 and contacts R1-4 and R2-4, the latter contacts being connected in parallel to each other. Contacts R4-1 are hold-in contacts connected in parallel across the start switch 327. Contacts R4-2 are connected in series with the coil of a starter relay R5, the contacts of which are interposed in the power lines for the motor M.

In normal operation the switch 327 is closed to energize the relays R4 and R5 which in turn actuates the motor M. The machine is stopped by opening the switch 326. In the event of a feeding failure in both of the magazines 40, 40' the relay contacts R1-4 and R2-4 will both open (as switches 260, 260', FIG. 3, are closed) in which case the relay R4 will be deenergized and the machine automatically stops as contacts R4-2 open.

When there is no slab on either of the platforms 252, 252' operation of the machine may be resumed by closing switch 323 and at the same time closing a jog switch 328 (FIG. 3a) which is connected in series with the coil of the motor start relay R5. The motor M is thus actuated to power the feed mechanism for the magazines 40, 40'. With relay contacts R3-1, R1-2 and R3-2, R2-2 all closed the feed means for both magazines will simultaneously feed slabs to the platforms 252, 252'. On the next machine cycle the fingers 250, 250' will both detect slabs of gum and thereafter alternate operation of the feed means will be resumed. Thereafter the start switch 327 may be closed to resume normal machine operation.

It is to be understood that the circuits of FIGS. 3 and 3a are simplified for illustrative purposes and that other circuits, not necessary for an understanding of the present invention, are provided for various heaters and safety switches. Also it will be noted that the contacts are, for clarity, shown twice, once in association with their relay coils and again as they are actually connected in the circuits.

Figure 11:
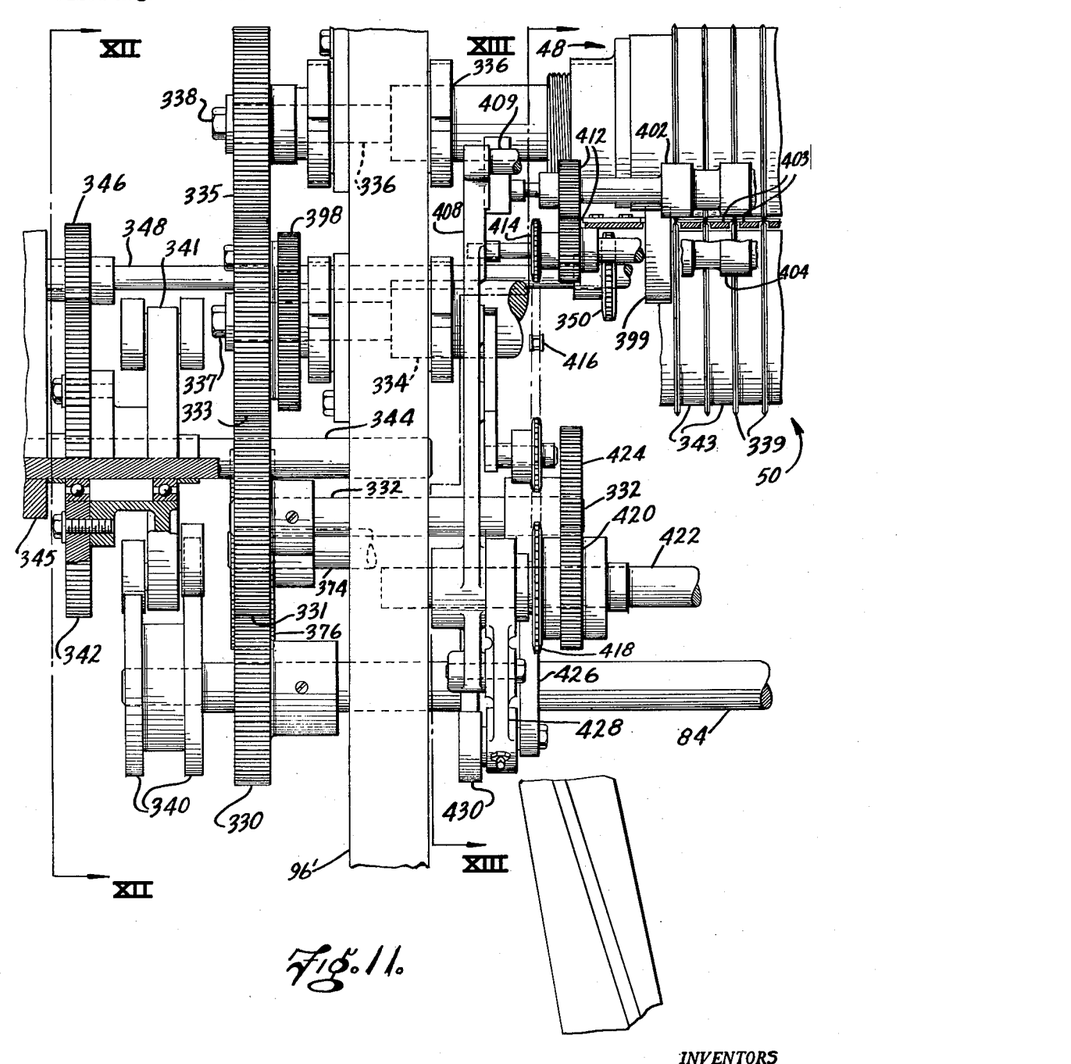
FIG. 11 is a rear elevation of the discharge side of the slitting rolls and other drive mechanism.
Figure 12:
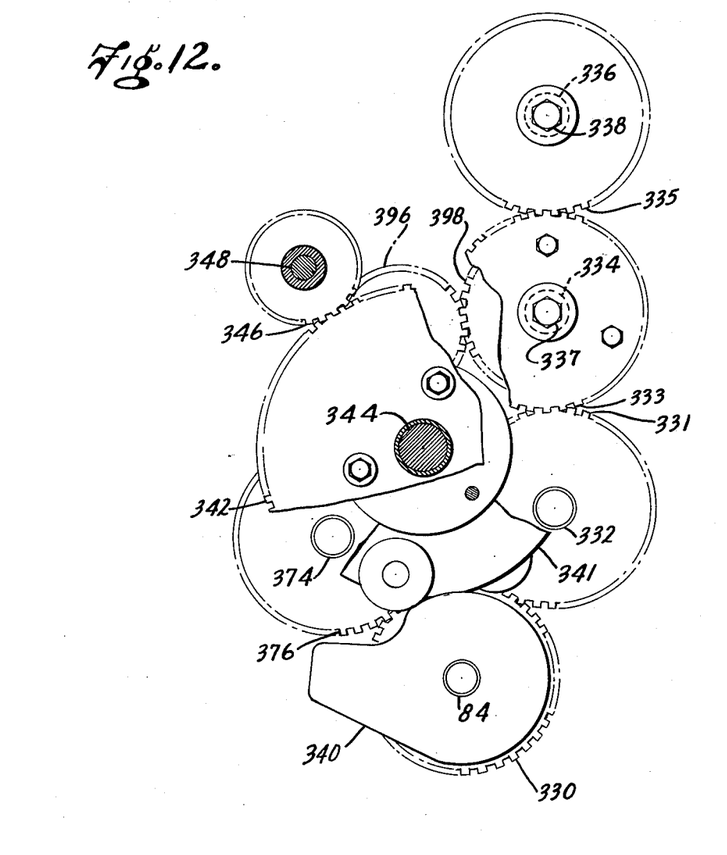
FIG. 12 is a view taken on line XII—XII in FIG. 11.

Next to be described are the driving means for the slitting rolls 48 and 50 and the means for feeding slabs of gum from the central platform 279 to and through the slitting rolls. Reverting to FIG. 2 it will be recalled that the main driving shaft 84 rotates continuously. This shaft extends across the rear of the feeding and scoring means and is journaled in the frame members 96, 96'. The outer end of the shaft 84 is best seen in the rear view of FIG. 11. Referring also to FIG. 12, it will be seen that the shaft 84 drives a train of gears comprising gear 330 secured to the shaft 84, gear 331 secured to a shaft 332, gear 333 secured to a shaft 334 and gear 335 secured to a shaft 336. The gears 333, 335 are keyed to the shafts 334, 336 and held thereon by bolts 337, 338 threaded into the ends of said shafts. The shafts 334 and 336 are journaled in the frames 96, 96' and carry the compositely formed slitting rolls 48 and 50. The slitting rolls 48 and 50 each comprise circular knives 339 and washer-like spacers 343. The constantly rotating slitting rolls 48, 50 are adjustably mounted relative to the frames 96, 96' for movement toward and away from each other as well as for axial movement so as to enable proper scoring of the gum slabs.

Figure 10:
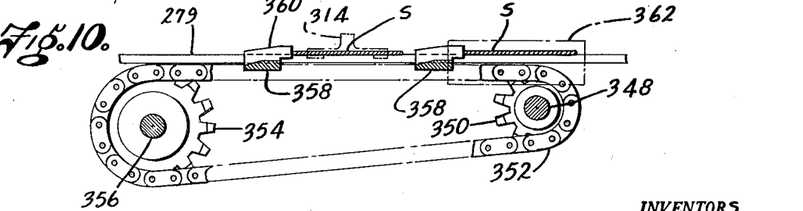
FIG. 10 is a section taken on line X—X in FIG. 1.
Figure 15:
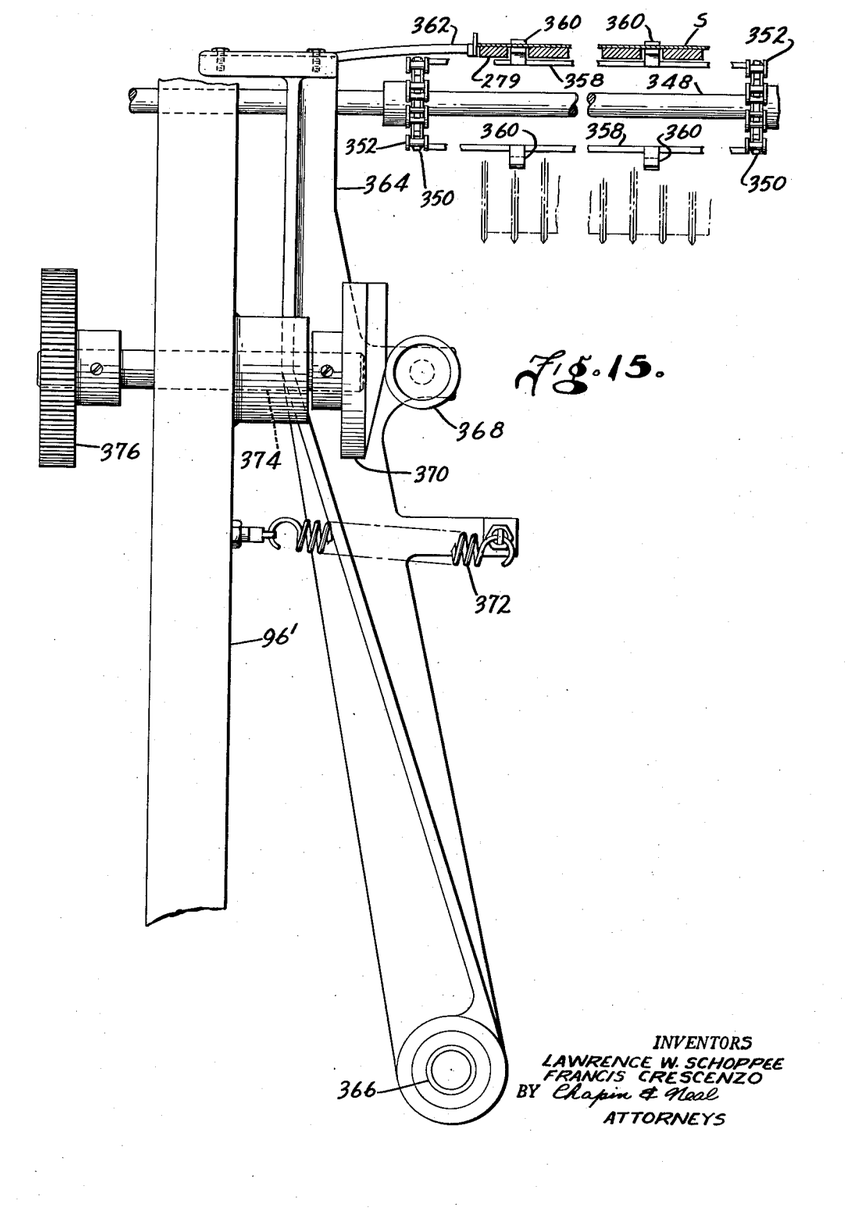
FIG. 15 is a section taken generally on line XV—XV in FIG. 10 and showing a pusher for laterally positioning slabs of gum relative to the scoring rolls; certain parts being omitted for the sake of clarity.

The means for advancing the slabs of gum from the central platform rails 279 to the slitting rolls 48, 50 comprise a conveyor which is driven from the main shaft 84 in the following manner. A pair of conjugate cams 340 (FIGS. 11 and 12) are secured to the outer end of the shaft 84 as seen in FIG. 11. The cams 340 intermittently rotate a roller Geneva mechanism 341 and thereby impart intermittent rotation to a gear 342 secured thereto. The Geneva mechanism and gear 342 are rotatably mounted on a shaft 344 which is supported at one end by the frame 96' and at the other end by a bracket 345. The Geneva mechanism 341 is a four-step mechanism so that for each revolution of the shaft 84 the gear 342 will be rotated 90° at the desired time in the cycle of operation of the magazine feeding means. The gear 342 meshes with a gear 346 which is secured to a shaft 348. The shaft 348 is journaled in the side frames 96, 96' and bracket 345 has mounted thereon a pair of spaced sprockets 350, which are best seen in FIGS. 10 and 15. Chains 352 are trained around the sprockets 350 and a second pair of sprockets 354 which are supported on an appropriately mounted, forwardly spaced shaft 356. Cross bars 358 span the chains 352, are equally spaced therealong and have lugs 360 projecting between and above the platform rails 279. The conveyor lugs 360 thus intermittently advance the slabs of gum toward the slitting rolls 48 and 50 after they have been fed to the platform rails 279 by the overhead transports 281, 281'.

At this point it will be noted that various factors make it difficult, if not impossible, for the overhead transports 281, 281' to laterally position the slabs of gum with any high degree of accuracy. Also it is found that the ends of the slabs of gum are quite frequently damaged. For these reasons it is desirable to trim both ends of the slabs of gum so that after passing through the slitting rolls 48, 50 the slabs of gum will have an accurate length and an exact number of sticks scored therein. It has been found that this end is best attained by deliberately feeding the slabs of gum so that they are always laterally offset in one direction relative to the slitting rolls 48, 50 when discharged to the platform rails 279 by the overhead transports 281, 281'. In the present machine the transport 281 is arranged to "overfeed" and the transport 281' "underfeeds" the slabs of gum so that regardless of which magazine the slabs are fed from they will be offset towards the right relative to the slitting rolls 48, 50.

After the slabs of gum are fed onto the rails 279, they will next be advanced an incremental amount bringing them to the position of the right hand slab of gum in FIG. 10. The incremental advance of the conveyor lugs 360 is of course derived from the Geneva mechanism 341. When in this next station the right hand end of the slab of gum is gently engaged by a pusher 362 (which is viewed from the rear in FIG. 15) to bring the slabs into a predetermined lateral relation relative to the rolls 48, 50.

The pusher 362 is mounted at the upper end of a long lever 364 (FIG. 15) which is pivotatlly mounted at its lower end about a fixed pin 366. A roller 368 is mounted on the lever 364 and is urged into engagement with a cam 370 by a spring 372 which extends between the arm 364 and frame member 96'. The cam 370 (see also FIG. 13) is secured to a shaft 374. The shaft 374 is journaled in the frame member 96' and has a gear 376 secured to its other end. The gear 376 meshes with and is driven by the gear 330 as may be seen in FIG. 12. The cam 370 is constantly rotated in timed relation to the various conveyors advancing the gum slabs and particularly the conveyor lugs 360. The oscillating pusher 362 reaches the innermost point of its stroke, as seen in FIG. 15, when each slab of gum is stationary at the second station of its advance along the rails 279.

Figure 13:
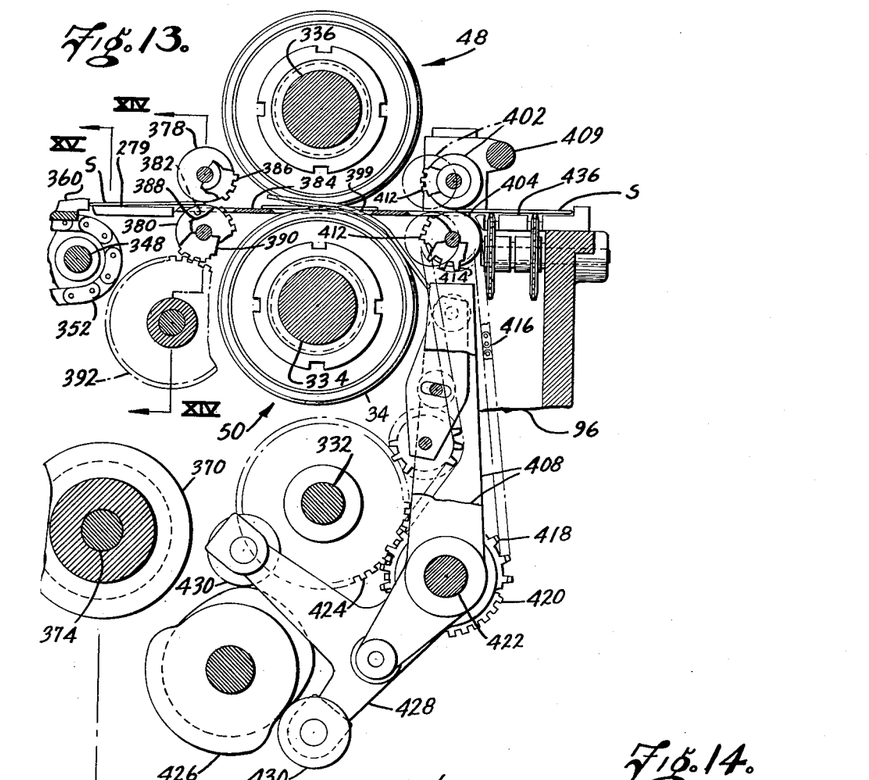
FIG. 13 is a section taken on line XIII—XIII in FIG. 11.
Figure 14:
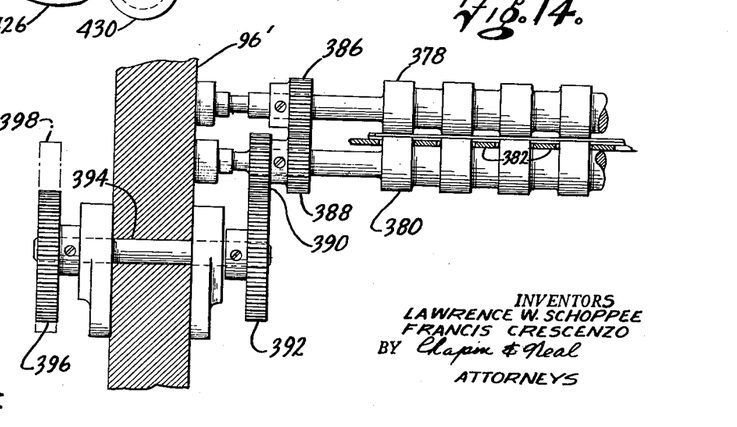
FIG. 14 is a section taken on line XIV—XIV in FIG. 13.

The next incremental advance of the lugs 360 brings successive slabs of gum to the position seen in FIG. 13 wherein they will be fed between a pair of constantly rotating feed rolls 378, 380 (see also FIG. 14). The rolls 378, 380 have evenly spaced portions of reduced diameter along their lengths to enable better gripping of the gum and to provide clearance for fingers 382 of a supporting platform 384. Opposite ends of the rolls 378, 380 are reduced in diameter and journaled in the frame member 96, 96'. Meshing gears 386, 388 are secured to the rolls 378, 380 respectively and a second gear 390 is also secured to the roll 380. The gear 390 meshes with a gear 392 which is secured to a shaft 394 journaled in the frame member 96'. A second gear 396 is secured to the outer end of the shaft 394 and meshes with a gear 398 (FIG. 12), which is secured to and rotates with the gear 333. The feed rolls 378, 380 are constantly rotating so that they may carry slabs of gum ahead of the conveyor lugs 360 and feed the leading edge of each slab of gum into the bite between the slitting rolls 48, 50.

Each slab of gum passes from the constantly rotating infeed rolls 378, 380 to the constantly rotating slitting rolls 48, 50, being supported by the platform 384 as it passes therethrough. The slitting rolls 48 and 50 score, but do not completely sever the slabs as individual sticks of gum are defined therein. As pointed out above, the slabs of gum cannot be accurately controlled in length or lateral position. Therefore a slab of accurate length is obtained by trimming portions off each end of the slab as defined by the knives 34 at opposite ends of the rolls 48, 50. The pusher 362, as previously described, has laterally positioned each slab to attain this end. In order to sever these end portions, curved shear plates 399 (FIGS. 11 and 13) are provided outside each end knife 34. The shear plates cooperate with the edges of the platform 384 to sever the end portions of the gum as the slabs are advanced beyond the slitting rolls 48, 50.

The slabs of gum now have an accurate length with a given number of sticks defined by score lines therein. Just after the slabs pass from the rolls 48, 50 they are gripped by a pair of discharge rolls 402, 404 (FIG. 13) which preferably rotate at the same peripheral speed as the rolls 48, 50. The discharge rolls 402, 404 have portions of reduced diameter along their lengths for better control of the slabs and to provide clearance for fingers 403 on the discharge side of platform 384. The rolls 402, 404 are journaled at their opposite ends adjacent the upper ends of levers 408 (FIGS. 11 and 13) which are connected by a tie rod 409. A pair of meshing gears 412 are secured to the rolls 402, 404 and a sprocket 414 is also secured to the roll 404. A chain 416 is trained around the sprocket 414 and around a second sprocket 418 adjacent the lower end of the near lever 408. The sprocket 418 and gear 420 secured thereto are rotatably mounted on a shaft 422 which is pivoted at its opposite ends to the frame members 96, 96'. The levers 408 are secured to the shaft 422 for swinging movement. The gear 420 meshes with a gear 424 which is secured to the shaft 332 and driven by the gear 331. A driving connection is made from the main shaft 84 and gears 330, 331 and through the gears 424, 420 and chain 416 to impart continuous rotation of the discharge rolls 402, 404. Additionally oscillating movement is imparted to the discharge rolls 402, 404 swinging them to and from the phantom position illustrated in FIG. 13. This oscillating movement is derived from a pair of conjugate cams 426 secured to the main shaft 84. Arms 428 are adjustably secured to one or both levers 408 and are provided with followers 430 which engage the cams 426. In operation the rolls 402, 404 are in their foremost phantom positions when a slab of gum is discharged from the slitting rolls 48, 50. Once a slab of gum enters the bite between the rolls 402, 404 they will begin to move away from the slitting rolls 48, 50 to the illustrated full line positions wherein they will be discharged upon a platform 436. The scored slabs are then advanced along the platform 436 towards the breaker means 52, seen in FIG. 1.

It will be apparent that, in many respects, articles other than slabs of gum could as well be fed by the present apparatus in order to maintain continuous or substantially continuous operation of a successive machine. The scope of novelty and utility of the present inventive concepts is, therefore, to be derived solely from the following claims.

Having thus described the invention what is claimed as novel and desired to be secured by Letters Patent of the United States is:

We claim:

1. An article feeding system comprising two magazines, a platform, means for alternately feeding articles from said magazines to said platform, means for discharging the articles from said platform at a given rate, and means responsive to a failure in the feed from one magazine for initiating the feed of articles from the other magazine to said platform at said given rate.

2. An article feeding system comprising two magazines, a platform to which articles are fed from said magazines, means for discharging articles from said platform at a given rate, means for feeding articles from one of said magazines to said platform at said given rate, means for feeding articles from the other of said magazines to said platform also at said given rate, means for alternately actuating single cyclic operation of said feeding means to feed articles to said platform from first one and then the other magazine, and means responsive to a failure in one of said feeding means for actuating continuous operation of the other feeding means.

3. An article feeding system comprising two magazines disposed in side-by-side relation and spaced apart a distance at least equal to the width of the articles, a central platform disposed between said magazines and to which articles are fed from said magazines, means for discharging articles from said central platform at a given rate, means for feeding articles from one magazine to said central platform at said given rate, means for feeding articles from the other magazine to said central platform also at said given rate, means for alternately actuating single cyclic operation of said feeding means to feed articles to said central platform from first one and then the other of said magazines, and means responsive to a failure in one of said feeding means for actuating continuous operation of the other feeding means.

4. An article feeding system comprising two magazines disposed in side-by-side relation and spaced apart a distance greater than the width of the articles, a central platform to which articles are fed from the magazines, said central platform being disposed between said magazines and spaced to the rear thereof, a transfer platform at the rear of each magazine, means for discharging articles from said central platform at a given rate, means for feeding articles from one of said magazines to said central platform at said given rate, means for feeding articles from the other magazine to said central platform also at said given rate, each of said feeding means comprising means for advancing an article from the respective transfer platform to said central platform and then advancing an article from the magazine to the respective transfer platform as a single cycle of operation, means for alternately actuating single cyclic operation of said feeding means to feed articles to said central platform from first one magazine and then the other, and means responsive to a failure in one of said feeding means for actuating continuous operation of the other feeding means.

5. An article feeding system as in claim 4 wherein the failure responsive means comprise means for detecting the proper advance of articles from said magazines to said transfer platforms.

6. A chewing gum slab feeding and scoring system comprising two magazines disposed in side-by-side relation and spaced apart a distance greater than the width of said slabs, a central platform disposed between said magazines and to which slabs are fed from said magazines, a pair of slitting rolls at one end of said central platform, means for advancing said slabs along said platform and feeding them to said slitting rolls at a given rate, means for feeding slabs from one magazine to said central platform at said given rate, means for feeding slabs from the other magazine to said central platform also at said given rate, one of said feeding means underfeeding and the other feeding means overfeeding the slabs to laterally offset all of the slabs toward one side of the central platform, and means for centralizing the slabs on said central platform as they are advanced towards said slitting rolls, means for alternately actuating single cyclic operation of said feeding means and means responsive to a failure in one of said feeding means for actuating continuous operation of the other feeding means.

7. A chewing gum slab feeding and scoring system comprising two magazines disposed in side-by-side relation and spaced apart a distance greater than the width of said slabs, a central platform disposed between said magazines and to which slabs are fed from said magazines, a pair of slitting rolls at one end of said central platform, means for advancing said slabs along said platform and feeding them to said slitting rolls at a given rate, means for feeding slabs from one magazine to said central platform, means for feeding slabs from the other magazine to said central platform, said feeding means alternately feeding slabs to said central platform, one of said feeding means underfeeding and the other feeding means overfeeding the slabs to laterally offset all of the slabs toward one side of the central platform, and means for centralizing the slabs on said central platform as they are advanced towards said slitting rolls.

8. A feeding and scoring system as in claim 7 wherein the slab advancing means is intermittently operating and advances the slabs from the position received on the central platform to a second position short of the slitting rolls, and the centralizing means comprise a pusher and means for moving the pusher against the end of each of said slabs toward said one side, when the slabs are at rest at said second position, said pusher being moved to a predetermined position each time a slab is engaged.

9. An article feeding system comprising two magazines disposed in side-by-side relation and spaced apart a distance greater than the width of the articles, a central platform to which articles are fed from the magazines, said central platform being disposed between said magazines and spaced to the rear thereof, a transfer platform at the rear of each magazine, said transfer platforms being laterally aligned with said central platform and each other, means for discharging articles from said central platform at a given rate, means for feeding articles from one of said magazines to said central platform at said given rate, means for feeding articles from said other magazine to said central platform also at said given rate, each of said feeding means comprising an overhead flight conveyor for advancing an article from the respective transfer platform to said central platform and a second conveyor for advancing the lowermost article in the respective magazine to the transfer platform at the rear thereof, a drive shaft, cams rotated by the drive shaft for first operating the overhead conveyor and then operating the second conveyor in each rotation of the drive shaft as a single cycle of operation of the feeding means, a common operating shaft for rotating both said drive shafts, means for alternately coupling said drive shafts to said operating shaft for successive single revolutions of the two drive shafts whereby articles are fed to said central platform from first one and then the other magazine, and means responsive to a failure in one of said feeding means for maintaining the drive shaft of the other feeding means coupled to said operating shaft whereby the articles are then continuously fed to the central platform from the other magazine.

10. An article feeding system as in claim 9 wherein the means for alternately coupling each shaft to the operating shaft comprise a single revolution clutch for each drive shaft, and a solenoid controlling each clutch which is alternately energized and deenergized to alternately couple and uncouple the drive shaft with the operating shaft, a half speed shaft continuously driven by said operating shaft, a single pole double throw switch for alternately energizing and deenergizing both of said solenoids and means controlled by said half speed shaft for closing first one and then the other of the contacts of said switch and further wherein the failure response means comprise means bypassing said switch and maintaining the solenoid for the drive shaft of the other feeding means, energized continuously.

11. An article feeding system as in claim 10 wherein the failure responsive means comprise a finger at each transfer platform swung against each article immediately after having been advanced thereon, the movement of said fingers being limited by properly positioned articles, a limit switch associated with each finger and arranged to be closed in the absence of a properly positioned article, the means for bypassing said double throw switch being operative in response to closure of either limit switch, and means for bypassing said limit switches to simulate the presence of articles at said transfer platforms whereby alternate operation of the feeding means may be resumed after correction of a feeding failure.

12. An article feeding system as in claim 11 wherein means responsive to failures in both feeding means stop operation of said operating shaft, and further wherein means are provided for temporarily overcoming said last-named means and initiating operation of said operating shaft after said feeding failures have been corrected to again resume normal alternate operation of the feeding means.

References Cited in the file of this patent

UNITED STATES PATENTS

| | | |
|---|---|---|
| 2,139,877 | Brandt | Dec. 13, 1938 |
| 2,680,051 | James | June 1, 1954 |
| 2,993,583 | Sykes | July 25, 1961 |